(12) United States Patent
Nikolaus

(10) Patent No.: US 7,028,531 B2
(45) Date of Patent: Apr. 18, 2006

(54) SENSOR ARRANGEMENT

(75) Inventor: Gerhard Nikolaus, Engerwitzdorf (AT)

(73) Assignee: E+E Elektronik Ges.m.b.H., Engerwitzdorf (AT)

( * ) Notice: Subject to any disclaimer, the term of this patent is extended or adjusted under 35 U.S.C. 154(b) by 0 days.

(21) Appl. No.: 10/203,600

(22) PCT Filed: Feb. 1, 2001

(86) PCT No.: PCT/EP01/01052

§ 371 (c)(1),
(2), (4) Date: Nov. 27, 2002

(87) PCT Pub. No.: WO01/58731

PCT Pub. Date: Aug. 16, 2001

(65) Prior Publication Data

US 2003/0140681 A1 Jul. 31, 2003

(30) Foreign Application Priority Data

Feb. 11, 2000 (DE) ................ 100 06 219

(51) Int. Cl.
G01N 19/10 (2006.01)
(52) U.S. Cl. .......... 73/29.05; 73/29.02; 73/335.04
(58) Field of Classification Search .......... 73/29.01, 73/335.04, 29.05, 29.02; 324/664
See application file for complete search history.

(56) References Cited

U.S. PATENT DOCUMENTS

| 3,934,111 A | 1/1976 | Roselli et al. | |
|---|---|---|---|
| 4,032,745 A | 6/1977 | Roselli | |
| 4,408,660 A | 10/1983 | Sutoh et al. | |
| 4,812,615 A | 3/1989 | Manzoni | |
| 4,942,364 A * | 7/1990 | Nishijima et al. | 324/696 |
| 5,010,289 A | 4/1991 | Takada | |
| 5,057,666 A | 10/1991 | Takada | |
| 5,189,902 A | 3/1993 | Groeninger | |
| 5,473,119 A * | 12/1995 | Rosenmayer et al. | 174/255 |
| 5,708,566 A * | 1/1998 | Hunninghaus et al. | 361/704 |
| 5,724,232 A * | 3/1998 | Bhatt et al. | 361/762 |
| 5,804,719 A | 9/1998 | Didelot et al. | |
| 5,814,726 A | 9/1998 | Mitter | |
| 2002/0113673 A1* | 8/2002 | Crescenzi et al. | 333/247 |

FOREIGN PATENT DOCUMENTS

| DE | 2 406 836 | 8/1974 |
|---|---|---|
| DE | 25 17 087 | 11/1975 |
| DE | 37 21 659 | 1/1989 |
| DE | 39 35 563 | 5/1990 |

(Continued)

OTHER PUBLICATIONS

Technical Bulletin, entitled "Preliminary HC 103 Humidity Sensor Element (Bare Chip)", E+E Elektronik Ges.m.b.H, Austria.

(Continued)

Primary Examiner—Hezron Williams
Assistant Examiner—John C Hanley
(74) Attorney, Agent, or Firm—Kenyon & Kenyon

(57) ABSTRACT

A sensor arrangement is suitable for detecting if a windscreen of a motor vehicle is fogging. The sensor arrangement includes a heat conducting layer disposed on a supporting surface, the layer exhibiting good heat conducting properties. A support plate is arranged on top of the heat conducting layer, including a recess and several electrical conductor tracks. A moisture-sensitive sensor element is arranged in the region of the recess of the support plate. The sensor element is electroconductively connected to the conductor tracks on the support plate. The temperature difference between the sensor element and the supporting plate may not exceed a given limit when measurement occurs.

22 Claims, 2 Drawing Sheets

FOREIGN PATENT DOCUMENTS

| | | |
|---|---|---|
| DE | 40 04 414 | 8/1990 |
| DE | 196 16 715 | 11/1997 |
| EP | 0 723 897 | 7/1996 |
| EP | 0 801 302 | 10/1997 |

OTHER PUBLICATIONS

Heidenhain Specification for Humidity Sensor HC 102, Version Sep. 15, 1999.

* cited by examiner

SENSOR ARRANGEMENT

FIELD OF THE INVENTION

The present invention is directed to a sensor system which is suited, in particular, for detecting the fogging or misting of the inside of a motor-vehicle windshield.

BACKGROUND INFORMATION

Numerous approaches are conventional for avoiding the fogging of windshields in automobiles. U.S. Pat. No. 4,408,660, for instance, describes regulating the motor-vehicle air-conditioning system on the basis of output signals from many different types of sensors, in order to prevent fogging. Among the sensors used or required is a humidity sensor, which measures the relative humidity or the dew point on the particular motor-vehicle windshield. However, the foregoing does not include any further references to the specific arrangement of the humidity sensor. Moreover, the control concept requires at least one further sensor for measuring the temperature, so that considerable outlay is entailed for sensor technology.

Another approach for dealing with the above problem provides for using an infrared sensor to determine the surface temperature of one region of the automobile windshield. With the aid of this sensor and other humidity sensors in the passenger compartment, the humidity and/or the temperature of the passenger compartment can be regulated via the motor-vehicle air-conditioning system, to reliably prevent the windshields from fogging up. The drawback of this variant is likewise the substantial outlay for sensor technology.

In summary, therefore, existing approaches typically require a multiplicity of sensors to reliably sense the fogging of the motor-vehicle windshield.

SUMMARY

It is an object of the present invention, therefore, to provide a sensor system that is simple to construct and is suited for reliably sensing the fogging of a supporting surface, in particular of a motor-vehicle windshield.

The proposed measures may ensure that, with the aid of a single sensor system according to the present invention, it is possible to reliably sense and, therefore, prevent the fogging of a supporting surface, for example the inside of a motor-vehicle windshield. For this purpose, the output signals from the sensor system according to the present invention are fed to a corresponding climate control, i.e., to a controlled air-conditioning system. The sensor system according to the present invention merely detects the relative humidity on the supporting surface. It may be ensured, in this connection, that the sensor element used precisely detects the actual relative humidity on the supporting surface, since, in the measuring operation, the sensor element has virtually the same temperature as the supporting surface. Various measures are applied to make certain that there is merely a slight temperature differential between the supporting surface and the sensor element.

Thus, the sensor system according to the present invention provides a reliable manner to overcome the fogging problem described above, while entailing minimal outlay for sensory technology.

Moreover, by eliminating additional sensor elements, there are altogether fewer system errors. This is because, ultimately, each individual sensor element contributes to the overall error in the context of detecting fogging. The result is greater system accuracy and reliability.

According to one example embodiment of the present invention, a sensor system for mounting on a supporting surface includes: a thermally conductive layer having a high thermal conductivity arranged on the supporting surface; a support plate on the thermally conductive layer including at least one recess, a plurality of electrical conductor tracks and at least one bore adjacent to the recess, the bore including a thermally conductive coating; a humidity-sensitive sensor element positioned in a vicinity of the recess of the support plate and electroconductively connected to the conductor tracks on the support plate, the sensor element positioned on a side of the support plate above the recess and oriented averted from the supporting surface; and a fastening arrangement configured to fasten the support plate on the supporting surface; wherein the sensor system is configured so that a predefined temperature difference is not exceeded between the sensor element and the supporting surface during a measuring operation.

According to another example embodiment of the present invention, a sensor system for mounting on a supporting surface includes: a thermally conductive layer having excellent thermal conductivity, placed on the supporting surface; a support plate on the thermally conductive layer, which includes at least one recess, as well as a plurality of electrical conductor tracks; a humidity-sensitive sensor element, which is positioned in the vicinity of the recess of the support plate and which is electroconductively connected to the conductor tracks on the support plate; it being ensured that a predefined temperature difference is not exceeded between the sensor element and the supporting surface during the measuring operation; as well as fastening means for securing the support plate and the sensor element to the supporting surface.

Further advantages of the sensor system according to the present invention and details pertaining thereto are derived from the following description of exemplary embodiments, on the basis of the figures.

DETAILED DESCRIPTION

Figure 1:
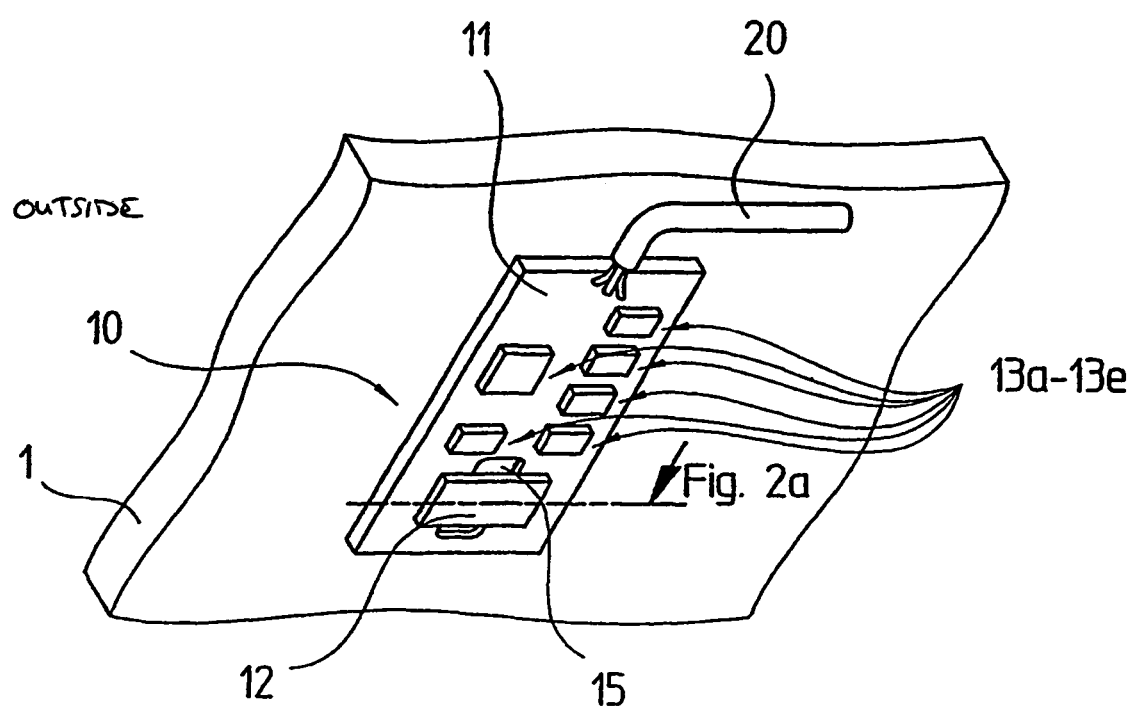
FIG. 1 is a perspective view of a motor-vehicle windshield, including a first example embodiment of the sensor system according to the present invention.

FIG. 1 illustrates a part of the inside of a motor vehicle windshield 1, which, in this exemplary embodiment, is used as a supporting surface and in which fogging is to be prevented. Sensor system 10 is mounted on the side of motor-vehicle windshield 1 facing the passenger compartment. FIG. 1 also illustrates a first example embodiment of such a sensor system. The output signals from sensor system 10 are fed via a connecting cable 20 to a controlled motor-vehicle air-conditioning system. On the basis of the delivered humidity-dependent sensor signals, the air-conditioning system prevents the inside of motor-vehicle windshield 1 from fogging and, thus, a potential sight obscuration. For this reason, it is possible to vary the heating temperature and/or the ventilation flow rate in a defined manner, via the motor-vehicle air-conditioning system.

Using sensor system 10 according to the present invention, it is merely the relative air humidity that is determined on that side of motor-vehicle windshield 1 on which sensor system 10 is mounted. As soon as a predefined limiting value for the relative air humidity RH, e.g., RH=95%, is exceeded, as previously indicated, appropriate counter-measures are taken in terms of control engineering, via the motor-vehicle air-conditioning system. In comparison to conventional fog-prevention approaches which always focused on determining the dew point on the motor-vehicle windshield, sensor system 10 according to the present invention provides a comprehensive approach based on simple sensory technology. In particular, the approach according to the present invention manages without additional sensors, such as temperature sensors, etc.

In FIG. 1, of sensor system 10 according to the present invention a support plate 11 is illustrated on which is mounted a humidity-sensitive sensor element 12 over a recess 15, as well as further electronic components 13a–13e. Support plate 11 is configured as a conventional circuit plate of FR4 material and does not contain any electrical conductor tracks for contacting the components mounted thereon. The thickness of support plate 11 may be within the range of 1–2 mm. Via connecting cable 20, sensor system 10 is connected to the downstream signal-processing unit, for example to a corresponding climate control of the motor-vehicle air-conditioning system. In this context, connecting cable 20 may be detachably connected to support plate 11, for example using an appropriate connector.

In this example embodiment, sensor element 12 is configured as a conventional capacitive thin-film humidity sensor, which has a dielectric, e.g., a suitable polymer material, between two electrodes, which changes capacitance as a function of humidity. The electrodes and dielectric are usually placed on a suitable carrier substrate, such as glass. Accordingly, on the output side, sensor element 12 supplies electric signals in a generally conventional manner. They are a measure of the relative humidity in the particular ambient environment.

As illustrated in FIG. 1, sensor element 12 is positioned in the vicinity of a rectangular recess 15 of support plate 11. Via recess 15 in support plate 11, a certain air circulation is ensured in the area of the sensor. The longitudinal axis of rectangular recess 15 is aligned perpendicularly to the longitudinal axis of sensor element 12. In this example embodiment, sensor element 12 is positioned on the side of support plate 11 which is oriented so as to face away from windshield 1. For this reason, sensor element 12, as well as the other components 13a–13e on support plate 11, are configured as SMD components. Thus, on that side in the area of bearing surface on support plate 11, sensor element 12 has electrically conductive contacts, which face support plate 11. In this manner, a simple, efficient fabrication of sensor system 10 may be ensured, e.g. since support plate 11 is then able to be populated in automated fashion.

Also illustrated in FIG. 1 is that sensor element 12 has a rectangular form and, at least in one dimension, is greater in length than recess 15, so that sensor element 12 rests in two contact areas on support plate 11.

The additionally provided components 13a–13e on support plate 11 are used for processing the output signals from sensor element 12. A further signal processing of this kind may be implemented, for instance, in the form of a signal amplification; in addition, the conversion into a simply transmittable and further processable signal may be provided. Further components may be used for protecting sensor system 10 from electrical overvoltages and disturbing electromagnetic influences, etc. The various electronic components 13a–13e are provided on support plate 11 with a protective coating, which protects them from mechanical influences, as well as from humidity and pollution, etc. As an example, a protective lacquer manufactured by the firm Grace, marketed under the type designation Eccocoat, is suited for this purpose.

Figure 2A:
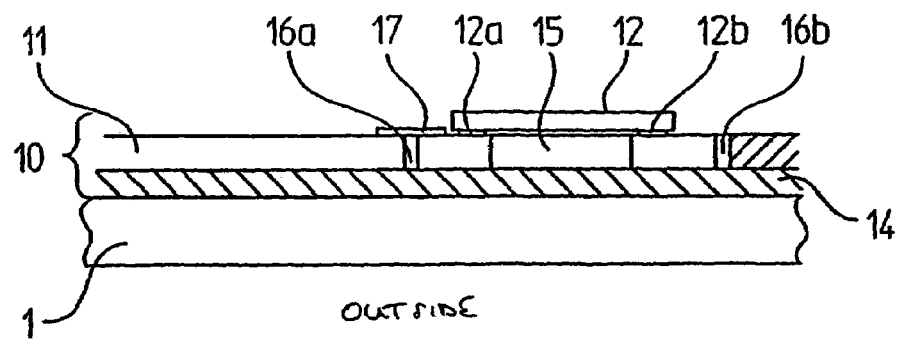
FIG. 2a is a part-sectional view of the sensor system illustrated in FIG. 1.
Figure 2B:
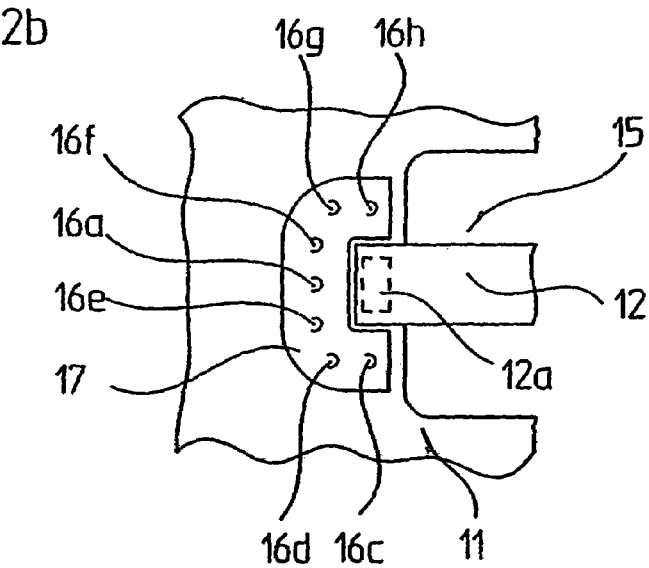
FIG. 2b is a part-sectional view of the sensor system illustrated in FIG. 1.

To further clarify the first exemplary embodiment of the sensor system according to the present invention, reference is made to FIGS. 2a and 2b, each illustrating a part-sectional view of sensor system 10 illustrated in FIG. 1 in the vicinity of recess 15 of support plate 11. Illustrated here, in turn, is motor-vehicle windshield 1 having sensor system 10 positioned thereon.

As illustrated in FIG. 2a, support plate 11 is secured in this example embodiment via a thermally conductive layer 14 to motor-vehicle windshield 1, i.e., to the supporting surface. In the illustrated exemplary embodiment, thermally conductive layer 14 has various functions. Of primary significance may be thermal conduction of this layer 14. Furthermore, in this example embodiment, thermally conductive layer 14 also acts as a fastening arrangement for support plate 11 mounted thereon and for sensor element 12.

In another example embodiment, the thermally conductive layer or adhesive layer is formed as a doubly-sided cementing adhesive film, as is available from 3M under the type designations 9882, 9885 or 9890 as an example. An important consideration in selecting a suitable adhesive layer in this context may be that it may have the most efficient possible thermal conduction properties. The customary thickness of the adhesive layer varies, depending on the type used, for instance between 0.05 mm and 0.25 mm.

Positioned above recess 15 is humidity-sensitive sensor element 12. Suitable sensor elements 12 are marketed by the Applicant hereof under the type-designations HC102 or HC103. In FIG. 2a, on the bottom side of sensor element 12, reference numerals 12a, 12b schematically denote the electrically conductive contacts, which are used to make electrical contact with and connect to the conductor tracks in support plate 11. Contacts 12a, 12b are situated in sensor element 12 in the contact area, where the element 12 rests on support plate 11 outside of recess 15.

Sensor element 12 used, which in this exemplary embodiment is configured as an SMD component, has a humidity-sensitive surface, which, in the same manner as contacts 12a, 12b, is oriented toward support plate 11. Accordingly, in this exemplary embodiment of a humidity-sensitive sensor element 12, contacts 12a, 12b are positioned on the same side.

Illustrated in FIG. 2a in support plate 11 are vertical bores 16a, 16b which are placed so as to be directly adjacent to recess 15. Via these bores 16a, 16b, an efficient thermal conduction may be ensured between the supporting surface, i.e., windshield 1 and sensor element 12. In the plan view of a subsection of the sensor system illustrated in FIG. 2b, it is illustrated that, in this exemplary embodiment, a multiplicity of such bores 16a–16h are positioned adjacently to recess 15.

The diameters of bores 16a–16h may be selected to be identical to the diameters of the plated-through holes or bores otherwise provided on support plate 11, i.e., diameters between 0.3 mm and 0.8 mm are selected. As illustrated in FIG. 2b, a plurality of separate bores 16a–16h having smaller diameters, instead of fewer bores having larger diameters in support plate 11 may be provided.

In addition, in this exemplary embodiment, the various bores 16a–16h have a coating which may have good heat conduction properties, for example a copper coating, in the bore region, to ensure an excellent thermal conduction between supporting surface 1 and sensor element 12 via bores 16a–16h. The thermally conductive coating in the bore region may be formed to be as thick as possible, for instance thicker than 30 μm. An additional tinning of a copper coating of this kind further improves the thermally conductive properties.

Thermal conduction may be improved when such thermally conductive coatings of bores 16a, 16b are thermally conductively interconnected on that side of support plate 11, which is oriented in the direction of sensor element 12. For this, a corresponding coating 17 of support plate 17 in a surface area around sensor element 12 and its terminal contacts 12a, 12b may be provided, as illustrated in FIG. 2b. In this manner, a thermally conductive connection is established between the various bores 16a–16h.

Bores 16a–16h in support plate 11, as well as the use of thermally conductive layer 14 having excellent heat-conduction properties, may ensure in this exemplary embodiment that sensor element 12 and supporting surface 1, i.e., the inside of the windshield in measuring operation, have a substantially identical temperature. In addition, in this exemplary embodiment of the sensor system according to the present invention, the configuration of sensor element 12 as an SMD component also contributes to the efficient thermal coupling, since this may ensure an intimate thermal contact to the layers placed before sensor element 12.

It may, therefore, be important for sensor system 10 according to the present invention to have a best possible thermal contact between the side of windshield 1 on which fogging is to be prevented, and sensor element 12. It may be provided at the least, however, that a specific—e.g., as low as possible—temperature difference between supporting surface 1 and sensor element 12 not be exceeded during measuring operation. In the present example, a maximum temperature difference of about 0.5° C. results between the side of windshield 1 facing sensor element 12, and sensor element 12. Such a temperature gradient is still considered as not being critical to the measurement.

A further measure for optimizing the heat-conduction properties in this area of sensor system 10, in addition to the measures described above in connection with the borehole coating, may be, for instance, providing an additional, efficiently thermally conductive surface coating on that side of support plate facing thermally conductive layer 14, and at least in the bore region.

A second exemplary embodiment of the sensor system according to the present invention is described with reference to FIG. 3, which illustrates a part-sectional view of the sensor system.

Mounted on the inside of motor-vehicle windshield 100, i.e., on the corresponding supporting surface where fogging is to be prevented, is sensor system 110 according to the present invention. As in the first exemplary embodiment, this includes a thermally conductive layer 114, formed as an adhesive layer, and, placed over it, a support plate 111 having a recess 115. Humidity-sensitive sensor element 112 is placed on thermally conductive layer 114 in the vicinity of recess 115. Also schematically illustrated in FIG. 3 is an electronic component 113a, which is used for further signal processing and is mounted on that side of support plate 111 which is oriented so as to face away from the motor vehicle windshield 100.

With respect to suitable materials for the adhesive layer and for the support plate, reference is made at this point merely to the preceding example embodiment.

As a variation of the preceding example embodiment, sensor element 112 is positioned or placed in sensor system 110 according to the present invention. Thus, sensor element 112 in the area of recess 115 is directly positioned on thermally conductive layer 114 formed as an adhesive layer, the humidity-sensitive surface of sensor element 112 being oriented so as to face away from the motor-vehicle windshield. An SMD thin-layer humidity sensor is directly positioned, for example, on a doubly-sided cementing adhesive film, the humidity-sensitive surface of sensor element 112 being oriented toward support plate 111.

Sensor element 112 is electrically contacted from that side of sensor element 112 which is oriented so as to face away from motor-vehicle windshield or supporting surface 100. To this end, contacts 112a, 112b, via which the connection to the electrical conductor tracks in support plate 111 is made, are positioned on this side of sensor element 112. Accordingly, in this exemplary embodiment of sensor system 110 according to the present invention, the same humidity-sensitive SMD sensor element may be used as in the preceding example embodiment. The orientation of the humidity-sensitive surface or of contacts 112a, 112b is now selected to face away from the windshield.

Alternatively to the illustrated exemplary embodiment, it is also fundamentally possible to use bonding wires for electrical contacting, via which the contacts of the sensor element are electrically connected to the conductor tracks in the support plate.

Figure 3:
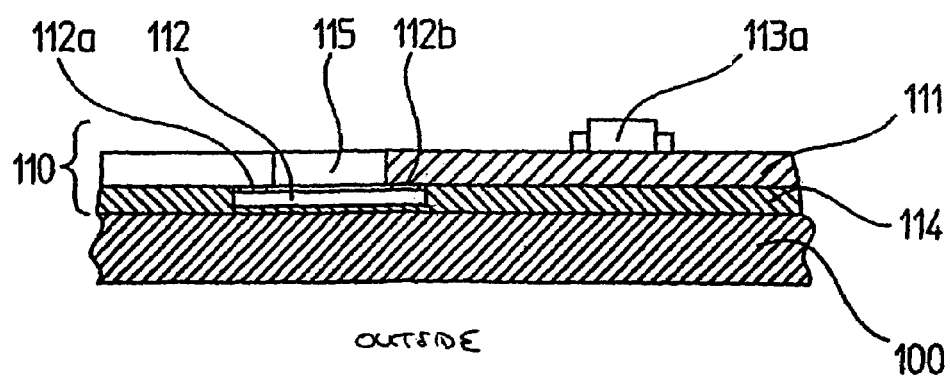
FIG. 3 is a part-sectional view of a second example embodiment of the sensor system according to the present invention.

The example embodiment of the sensor system according to the present invention illustrated in FIG. 3 allows the sensor element 112 to be placed even closer to that side of motor-vehicle windshield or supporting surface 100 where a potential fogging is to be detected. It may thus be ensured to an even greater degree that a smallest possible temperature difference results between sensor element 112 and supporting surface 100, i.e., that they exhibit nearly the same temperature as they do during measuring operation.

A further exemplary embodiment of the present invention may be provided to replace the thermally conductive layers formed as an adhesive layer, of the foregoing example embodiments, with a layer which merely has excellent thermal conductivity, but which is configured to be non-adhesive. Suited for this are, for example, ceramic-filled polymer films distributed under the designation Keratherm by the firm Kerafol, Keramische Folien GmbH. In such a case, appropriate mechanical fasteners may be used to secure the sensor system to the windshield or the supporting surface. For this, it may be provided, for example, to use the base of a rearview mirror as a fastening arrangement. Alternatively, a gap at the top windshield edge between the vehicle cover and the windshield may be used as a mechanical fastening arrangement, etc.

The present invention is, therefore, not limited to the described exemplary embodiments. Rather, within the scope of the considerations according to the present invention, there are a number of other variants of exemplary embodiments.

What is claimed is:

1. A sensor system for mounting on a supporting surface, comprising:

a thermally conductive layer having a high thermal conductivity arranged on the supporting surface;
a support plate on the thermally conductive layer including at least one recess, a plurality of electrical conductor tracks and a plurality of bores adjacent to the recess, the bores including a thermally conductive coating;
a humidity-sensitive sensor element positioned in a vicinity of the recess of the support plate and electroconductively connected to the conductor tracks on the support plate, the sensor element positioned on a side of the support plate above the recess;
a coating arranged in a specific surface area on at least one side of the support plate establishing a thermally conductive connection between the bores; and
a fastening arrangement configured to fasten the support plate on the supporting surface;
wherein the sensor system is configured so that a predefined temperature difference is not exceeded between the sensor element and the supporting surface during a measuring operation.

2. The sensor system according to claim 1, wherein the supporting surface includes an inside of a motor-vehicle pane facing a passenger compartment.

3. The sensor system according to claim 1, further comprising electronic components configured to process output signals from the sensor element mounted on the support plate.

4. The sensor system according to claim 3, wherein the electronic components include a protective coating.

5. The sensor system according to claim 1, wherein the support plate includes a detachable connection to a connecting cable.

6. The sensor system according to claim 1, wherein the support plate is made of FR4 material.

7. The sensor system according to claim 1, wherein the sensor element is configured as a capacitive thin-film humidity sensor having a humidity-sensitive dielectric arranged between a plurality of electrodes and a humidity-sensitive surface oriented toward the support plate.

8. The sensor system according to claim 1, wherein the sensor element is configured as an SMD component and on a side facing the support plate has electrically conductive contacts configured to connect to the conductor tracks of the support plate.

9. The sensor system according to claim 8, wherein the sensor element in at least one dimension is configured to be greater in length than the recess, and the electrically conductive contacts are arranged in contact areas outside of the recess.

10. The sensor system according to claim 1, wherein the thermally conductive coating is made of copper.

11. The sensor system according to claim 1, wherein the fastening arrangement includes a mechanical fastening arrangement.

12. A sensor system for mounting on a supporting surface, comprising:
a thermally conductive layer having a high thermal conductivity arranged on the supporting surface;
a support plate on the thermally conductive layer including at least one recess, a plurality of electrical conductor tracks and at least one bore adjacent to the recess, the bore including a thermally conductive coating;
a humidity-sensitive sensor element positioned in a vicinity of the recess of the support plate and electroconductively connected to the conductor tracks on the support plate, the sensor element positioned on a side of the support plate above the recess; and
a fastening arrangement configured to fasten the support plate on the supporting surface;
wherein the sensor system is configured so that a predefined temperature difference is not exceeded between the sensor element and the supporting surface during a measuring operation;
wherein the conductor tracks are arranged in the support plate;
wherein the sensor is arranged over the tracks and the recess, the tracks arranged in the support plate, the support plate arranged over the thermally conductive layer and the thermally conductive layer arranged over the supporting surface; and
wherein the supporting surface includes an inside of a motor-vehicle pane facing a passenger compartment.

13. The sensor system according to claim 12, further comprising electronic components configured to process output signals from the sensor element mounted on the support plate.

14. The sensor system according to claim 13, wherein the electronic components include a protective coating.

15. The sensor system according to claim 12, wherein the support plate includes a detachable connection to a connecting cable.

16. The sensor system according to claim 12, wherein the support plate is made of FR4 material.

17. The sensor system according to claim 12, wherein the sensor element is configured as a capacitive thin-film humidity sensor having a humidity-sensitive dielectric arranged between a plurality of electrodes and a humidity-sensitive surface oriented toward the support plate.

18. The sensor system according to claim 12, wherein the system is configured such that a temperature difference of 0.5° C. between the sensor element and the supporting surface is not exceeded during the measuring operation.

19. The sensor system according to claim 12, wherein the sensor element is configured as an SMD component and on a side facing the support plate has electrically conductive contacts configured to connect to the conductor tracks of the support plate.

20. The sensor system according to claim 19, wherein the sensor element in at least one dimension is configured to be greater in length than the recess, and the electrically conductive contacts are arranged in contact areas outside of the recess.

21. The sensor system according to claim 12, wherein the thermally conductive coating is made of copper.

22. The sensor system according to claim 12, wherein the fastening arrangement includes a mechanical fastening arrangement.

* * * * *